(12) United States Patent
Shen et al.

(10) Patent No.: US 11,689,458 B2
(45) Date of Patent: Jun. 27, 2023

(54) CONTROL DEVICE, CONTROL METHOD, AND PROGRAM

(71) Applicant: NTT Communications Corporation, Chiyoda-ku (JP)

(72) Inventors: Wenyu Shen, Nerima-ku (JP); Kenji Arai, Sumida-ku (JP); Ryu Kanishima, Koutou-ku (JP); Takeo Saga, Katsushika-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 142 days.

(21) Appl. No.: 17/273,508

(22) PCT Filed: May 28, 2019

(86) PCT No.: PCT/JP2019/021061
§ 371 (c)(1),
(2) Date: Mar. 4, 2021

(87) PCT Pub. No.: WO2020/059212
PCT Pub. Date: Mar. 26, 2020

(65) Prior Publication Data
US 2021/0359940 A1 Nov. 18, 2021

(30) Foreign Application Priority Data
Sep. 20, 2018 (JP) .................. 2018-176630

(51) Int. Cl.
*H04L 45/741* (2022.01)
*H04L 45/02* (2022.01)
*H04L 45/42* (2022.01)
*H04L 61/59* (2022.01)
*H04L 61/4511* (2022.01)

(52) U.S. Cl.
CPC ............ *H04L 45/741* (2013.01); *H04L 45/02* (2013.01); *H04L 45/42* (2013.01); *H04L 61/4511* (2022.05); *H04L 61/59* (2022.05)

(58) Field of Classification Search
None
See application file for complete search history.

(56) References Cited

U.S. PATENT DOCUMENTS

| 9,749,174 | B1 | 8/2017 | Goff et al. |
| 2005/0111384 | A1 | 5/2005 | Ishihara et al. |

(Continued)

FOREIGN PATENT DOCUMENTS

| JP | 2005-159986 A | 6/2005 |
| JP | 2005-229309 A | 8/2005 |

(Continued)

OTHER PUBLICATIONS

International Search Report dated Aug. 13, 2019 in PCT/JP2019/021061 filed on May 28, 2019, 2 pages.

(Continued)

*Primary Examiner* — Brian Whipple
(74) *Attorney, Agent, or Firm* — Oblon, McClelland, Maier & Neustadt, L.L.P.

(57) ABSTRACT

A control device is connected to a plurality of networks, dispatches a packet received from a user terminal to a network among the plurality of networks, and includes a memory and a processor configured to execute receiving a DNS query packet transmitted from the user terminal, and based on a query target of the DNS query packet, dispatching the DNS query packet to a network among the plurality of networks; and receiving a packet, determining a destination of the packet based on a destination address of the packet, and transmitting the packet to the determined destination.

10 Claims, 23 Drawing Sheets

(56) References Cited

U.S. PATENT DOCUMENTS

| | | | |
|---|---|---|---|
| 2005/0117514 A1 | 6/2005 | Iwata et al. | |
| 2007/0074281 A1* | 3/2007 | Ikeda | H04L 67/54 726/13 |
| 2018/0227763 A1* | 8/2018 | Kim | H04L 61/4511 |

FOREIGN PATENT DOCUMENTS

| | | | |
|---|---|---|---|
| JP | 2005-236480 A | 9/2005 | |
| JP | 2011-135417 A | 7/2011 | |
| JP | 2012-109837 A | 6/2012 | |
| JP | 5832970 B2 | 12/2015 | |

OTHER PUBLICATIONS

Japanese Office Action dated May 12, 2020 in Japanese Patent Application No. 2018-176630 filed on Sep. 20, 2018, 2 pages.
"About Internet Breakout", [Online], May 21, 2018, [retrieved on Jul. 29, 2019], Internet: https://bonseed.hatenadiary.jp/entry/2018/05/21/232337, 8 pages (with English translation).
Office Action dated Aug. 10, 2021 in corresponding Japanese Patent Application No. 2020-155570 (with English Translation), 5 pages.
Extended European Search Report dated Mar. 9, 2022, in corresponding European Patent Application No. 19861745.8, 9 pages.
Verizon UK LTD: "Clauses 1-9 of Connection Based Virtual Services", ETSI Draft, Aug. 30, 2018, XP014323195, pp. 1-48.
Anonymous: "Understanding SD-WAN Managed Services", Jul. 1, 2017, XP055895695, pp. 1-15.

* cited by examiner

FIG.4

APPLICATION MANAGEMENT DB

| APPLICATION NAME | FQDN | DESTINATION IP ADDRESS |
|---|---|---|
| Example | Example.com | |
| | Example365.com | B.B.B.B/B |

APPLICATION CACHE

| APPLICATION NAME | DESTINATION IP ADDRESS |
|---|---|
| Example | B.B.B.B |

(b)

APPLICATION CACHE
(AFTER APPLICATION DETECTED)

| APPLICATION NAME | DESTINATION IP ADDRESS |
|---|---|
| Example | A.A.A.A |
| | B.B.B.B |

FIG.6

DNS DISPATCH POLICY MANAGEMENT DB

| FQDN | OPERATION | Next hop |
|---|---|---|
| Example.com | Forward | Y.Y.Y.Y |
| Example365.com | Forward | Y.Y.Y.Y |
| Default | Forward | X.X.X.X |

FIG.7

(a) IP ROUTING POLICY MANAGEMENT DB

| DESTINATION IP ADDRESS | Next hop |
|---|---|
| X.X.X.X/X | I.I.I.I |
| Y.Y.Y.Y/Y | J.J.J.J |
| Z.Z.Z.Z/Z | Z.Z.Z.Z |
| Default | I.I.I.I |

(b) APPLICATION ROUTING POLICY MANAGEMENT DB

| TARGET APPLICATION | Next hop |
|---|---|
| Example | J.J.J.J |

FIG.11

APPLICATION ROUTING POLICY MANAGEMENT DB

| TARGET APPLICATION | DESTINATION PORT NUMBER | Next hop |
|---|---|---|
| DNS | 53 | Z.Z.Z.Z |
| Example | | J.J.J.J |

FIG.14

APPLICATION CACHE

| APPLICATION NAME | DESTINATION IP ADDRESS |
|---|---|
| Example | A.A.A.A |
|  | B.B.B.B |
|  | C.C.C.C |

FIG.16

(a) IP ROUTING POLICY MANAGEMENT DB

| DESTINATION IP ADDRESS | Next hop |
|---|---|
| B.B.B.B/B | J.J.J.J |
| X.X.X.X/X | I.I.I.I |
| Y.Y.Y.Y/Y | J.J.J.J |
| Z.Z.Z.Z/Z | Z.Z.Z.Z |
| Z'.Z'.Z'.Z'/Z' | Z'.Z'.Z'.Z' |
| Default | I.I.I.I |

(b) APPLICATION ROUTING POLICY MANAGEMENT DB

| TARGET APPLICATION | Next hop |
|---|---|
| Example | J.J.J.J |

FIG.17

PROXY DISPATCH POLICY MANAGEMENT DB

| FQDN | IP ADDRESS | OPERATION | Next hop |
|---|---|---|---|
| Example.com | B.B.B.B | PASS THROUGH | |
| Example365.com | | PASS THROUGH | |
| Default | | PROXY CHAINING | Z1.Z1.Z1.Z1 |

FIG.20

PROXY DISPATCH POLICY MANAGEMENT DB

| FQDN | IP ADDRESS | OPERATION | Next hop |
|---|---|---|---|
| Example.com | A.A.A.A | PASS THROUGH | |
| | B.B.B.B | PASS THROUGH | |
| | C.C.C.C | PASS THROUGH | |
| Example365.com | | | |
| Default | | PROXY CHAINING | Z1.Z1.Z1.Z1 |

FIG.23

APPLICATION CACHE

| APPLICATION NAME | DESTINATION IP ADDRESS | Timer |
|---|---|---|
| Example | A.A.A.A | 1 day |
| | B.B.B.B | INDEFINITE |
| | C.C.C.C | 1 day |

CONTROL DEVICE, CONTROL METHOD, AND PROGRAM

TECHNICAL FIELD

The present invention relates to a technique for accelerating access from a user terminal to a server or the like on a network.

BACKGROUND ART

In recent years, the use of Software-as-a-Service (SaaS) has become popular explosively. In one aspect, in SaaS, applications originally designed for use in a LAN environment are provided on the cloud; therefore, the performance depends on latency and quality of a network, and in particular, the effect of latency and quality of the network becomes greater as a corporation expands its operations more globally.

At present, a corporate network being typically a closed network is not designed to work with SaaS. For example, many corporate networks have limited connection points to the Internet; therefore, a SaaS connection via the Internet may form a detoured path.

Also, in the case where communication between sites is overlaid with communication related to SaaS on the same communication channel within a corporate network, the bandwidth of the channel becomes tight between the sites or the like. There is a prediction that more than half of corporations will have network-related problems with use of SaaS around 2020.

A technique of SD-WAN (Software-defined WAN) has been advocated by an organization called ONUG (Open Networking User Group) that was established by IT managers of major finance, distribution, and retail corporations in North America. Aiming at reduction of current WAN costs, simplification of operations, improvement of quality, and the like, many corporations have begun to introduce commercially available SD-WAN solutions. In the use of SD-WAN, what-is-termed Local Breakout focusing on SaaS access is regarded as the most promising use case.

Local Breakout is a mechanism for controlling routing at a branch site when accessing a SaaS in which a specific data flow is identified by using what-is-termed a Deep Packet Inspection (DPI) engine, to direct the identified data flow to the Internet from the branch site.

With use of SD-WAN Customer Premises Equipment (CPE), by implementing Local Breakout, and causing traffic directed to a SaaS to flow from a branch site directly to the Internet, it is expected to solve the various problems described above.

RELATED ART DOCUMENTS

Patent Documents

[Patent Document 1] Japanese Patent No. 5832970

SUMMARY OF INVENTION

Problem to be Solved by the Invention

However, it is often the case that conventional SaaS access methods using SD-WAN techniques are not optimized for actual use scenes; therefore, there are problems such that an unexpected latency occurs when accessing a SaaS server from a user terminal.

The present invention has been made in view of the above, and has an object to provide a technique that enables a user terminal communicating via a closed network to access a predetermined server on the Internet at high speed.

Means for Solving the Problem

According to the disclosed technique, a control device is provided that is connected to a plurality of networks, and dispatches a packet received from a user terminal to a network among the plurality of networks. The control device includes a DNS control unit configured to receive a DNS query packet transmitted from the user terminal, and based on a query target of the DNS query packet, dispatch the DNS query packet to a network among the plurality of networks; and a routing unit configured to receive a packet, determine a destination of the packet based on a destination address of the packet, and transmit the packet to the determined destination.

Advantage of the Invention

According to the disclosed technique, a technique is provided that enables a user terminal communicating via a closed network to access a predetermined server on the Internet at high speed.

BRIEF DESCRIPTION OF DRAWINGS

FIG. 4 is a diagram illustrating an example of information stored in an application management DB;

FIG. 5 is a diagram illustrating an example of information stored in an application cache;

FIG. 6 is a diagram illustrating an example of information stored in a DNS dispatch policy management DB;

FIG. 7 is a diagram illustrating an example of information stored in an IP routing policy management DB and an application routing policy management DB;

FIG. 11 is a diagram illustrating an example of information stored in an application routing policy management DB in the case of rewriting the destination of a DNS query;

FIG. 14 is a diagram illustrating an application cache in the case of updating the application cache from time to time by using a result of a DNS query;

FIG. 16 is a diagram illustrating an example of information stored in an IP routing policy management DB and an application routing policy management DB;

FIG. 17 is a diagram illustrating an example of information stored in a proxy dispatch policy management DB;

FIG. 20 is a diagram illustrating an example of information stored in a proxy dispatch policy management DB in the case of using an application cache;

FIG. 23 is a diagram illustrating an example of information stored in the application cache.

EMBODIMENTS OF THE INVENTION

Figure 1:
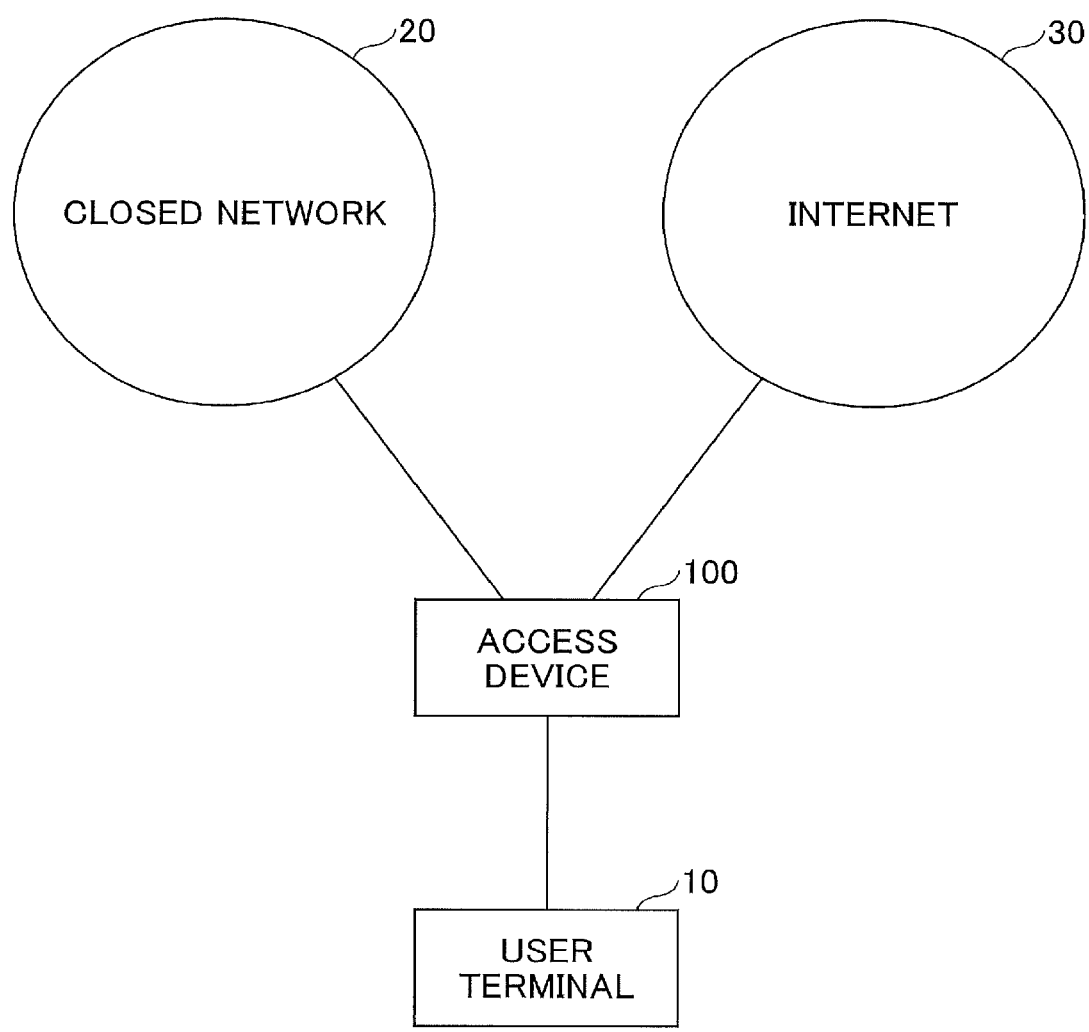
FIG. 1 is an overall configuration diagram of a system in an embodiment according to the present invention.

In the following, an embodiment according to the present invention will be described with reference to the drawings. The embodiment described below is merely an example, and embodiments to which the present invention can be applied not limited to the following embodiment.

(Problems)

First, the problems to be solved by an access device 100 described in the embodiment will be described. Note that the following three problems are merely examples, and the problems solved by the access device 100 are not limited to the following problems.

(1) Problem with DNS

In order to provide maximum performance for users in every region, many SaaS adopt a technique called GeoDNS. By using the GeoDNS, depending on the physical location of a client that has made a query to a DNS server, the IP address of a nearest SaaS server can be responded. Note that DNS stands for Domain Name System.

However, in many designs, internal DNS servers are installed at major sites such as datacenters for users in a corporation, and breakout upon a query is executed from one of these major sites to an external DNS server. Therefore, DNS traffic related to SaaS access comes out of a major site such as a datacenter to the Internet, whereas a corresponding data flow comes out of a branch site (e.g., a site set up in a country other than the datacenter) to the Internet, and thus, the exits of both are not the same. As a result, even though the breakout for the specific data flow related to the SaaS is executed at the branch site, as a consequence of having made the DNS query from the major site, the access may be directed to a nearest SaaS server from the major site, and hence, an expected effect of latency improvement may not be obtained.

(2) Problem with Proxy

It is often the case that a proxy (may also be referred to as a proxy device or a proxy server) is installed between user terminals and a SaaS server to execute communication via the proxy. However, depending on the type of SaaS, a large number of TCP sessions may be consumed during the use; therefore, such a SaaS may not be used comfortably because of the processing limit of the proxy hit by the increased sessions.

Thereupon, there has been demand for bypassing an existing proxy to reduce the processing load. In the conventional scheme, in order to bypass a proxy for SaaS traffic, aside from a SD-WAN device, an existing proxy needs to periodically check destinations of communications directed to SaaS, and the results need to be reflected in a proxy autoconfiguration (PAC) file, and the PAC file needs to be distributed to all end users. Therefore, in some cases, the operational load increases.

(3) Problem with Latency of Packet Identification

Also, in a conventional DPI engine of an SD-WAN device, a method is adopted that analyzes handshake exchanges of HTTP/HTTPs, and by using domain names of SaaS extracted in the analysis, determines a SaaS to be accessed. However, it is difficult for this method to identify a SaaS with a packet that has arrived first (first packet); therefore, the first flow directed to the SaaS may come out of the major site.

In the following, as an embodiment according to the present invention, techniques for solving the above problems will be described in detail. Note that in the present embodiment, although an access device 100 is connected to a closed network 20 and the Internet 30, this form is merely an example. Similar control may be executed between two networks other than the closed network 20 and the Internet 30. Also, the access device 100 may be connected to three or more multiple networks to dispatch packets to a network among the multiple networks.

(System Configuration)

FIG. 1 illustrates an overall configuration of a system in an embodiment according to the present invention. As illustrated in FIG. 1, the access device 100 connected to the user terminal 10, the closed network 20, and the Internet 30, is provided. The access device 100 is a device that connects the user terminal 10 to a device on the closed network 20 or to a device on the Internet 30, to execute communication in response to receiving access from the user terminal 10. Note that the access device 100 may be referred to as a SaaS-access accelerating device. Also, the access device 100 is a device to execute various types of control on data flows, and hence, may also be referred to as a control device.

The closed network 20 is, for example, an intra-corporate network that connects multiple sites of a corporation. The access device 100 is, for example, a device installed at each branch site in an intra-corporate network of a global corporation.

In the following, a configuration and operations of the access device 100 will be described in detail. In the following, a basic configuration of the access device 100 will be described as a first embodiment, and a configuration in which a proxy control unit is added to the access device 100 of the first embodiment will be described as a second embodiment.

First Embodiment

<Device Configuration>

Figure 2:
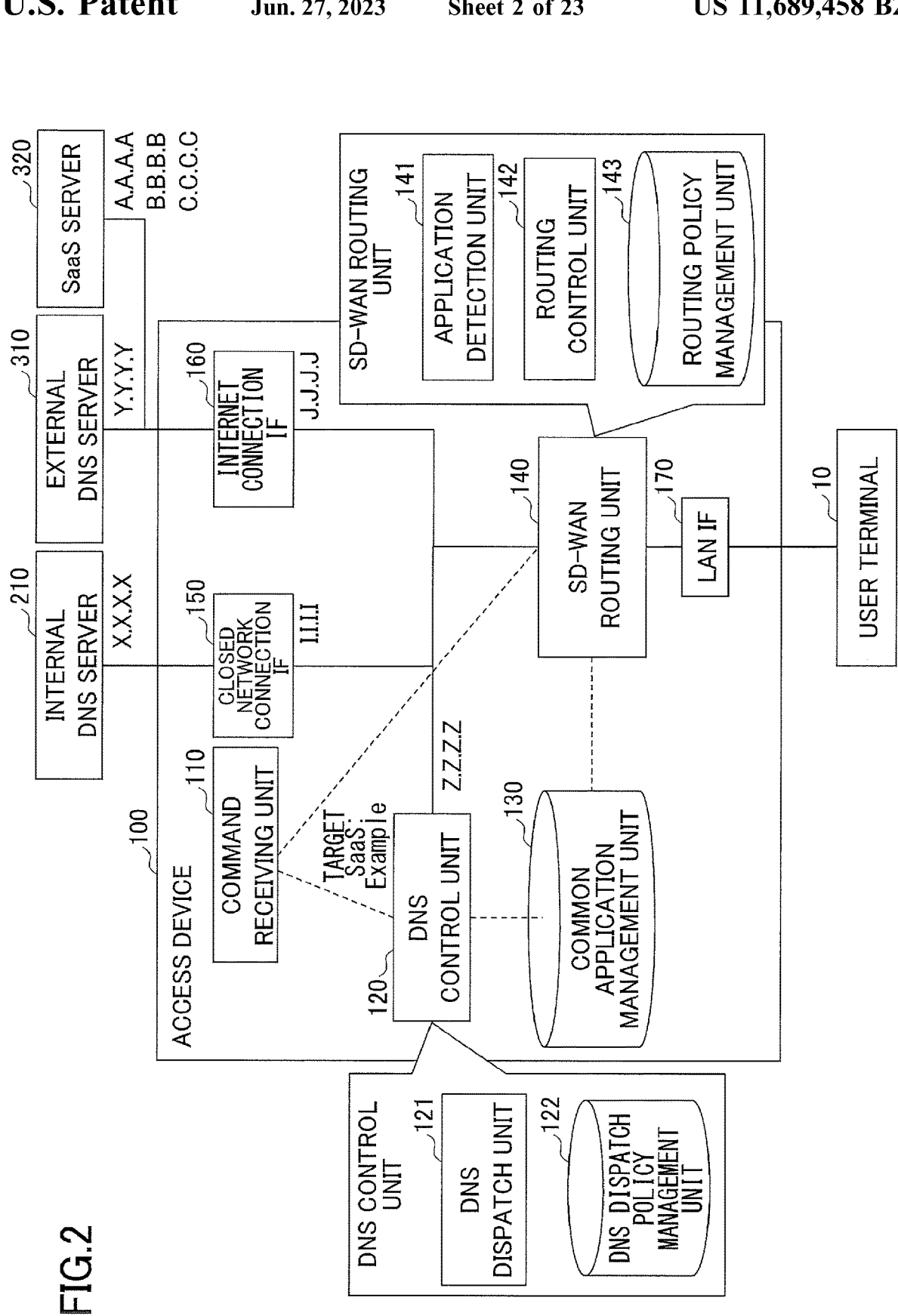
FIG. 2 is a functional configuration diagram of an access device 100 in a first embodiment.

FIG. 2 illustrates a functional configuration diagram of the access device 100 in the first embodiment. As illustrated in FIG. 2, the access device 100 includes a command receiving unit 110, a DNS control unit 120, a common application management unit 130, a SD-WAN routing unit 140, and multiple interfaces (IFs).

As an example of multiple IFs, FIG. 2 illustrates a closed network connection IF 150 for connecting to a closed network, an internet connection IF 160 for connecting to the Internet, and a LAN-IF 170 for connecting to a LAN. The closed network connections IF 150 and the internet connection IF 160 have respective IP addresses assigned as illustrated.

As illustrated, an internal DNS server 210 is connected to the closed network connection IF 150; an external DNS server 310 and a SaaS server 320 are connected to the internet connection IF 160; and the user terminal 10 is connected to the LAN-IF 170. Also, each server has an IP address assigned as illustrated. For the SaaS server 320 in the present embodiment, the IP address is not fixed, but changes from time to time.

Note that an IF is not limited to be a physical port, and may be a logical port that terminates a tunnel such as IPsec. Also, in the present embodiment, as an example, although the common application management unit 130 is provided for each access device, alternatively, the common application management unit 130 may be provided external to the access device 100, to be commonly used by multiple access devices. The respective units of the access device 100 will be described in detail later.

The access device 100 may be a system constituted with multiple computers (including communication devices and the like), or may be a device implemented with a single computer. Also, the computer may be a physical machine or may be a virtual machine. Also, the access device 100 may be implemented with a dedicated hardware circuit that executes processing described in the present embodiment.

In the case where the access device 100 is implemented with a computer, the access device 100 may be implemented by executing a program corresponding to the processing executed by the access device 100 using hardware resources such as a CPU, a memory, and the like built in the computer. The program can be recorded on a computer-readable recording medium (portable memory, or the like), to be stored or distributed. Also, it is also possible to provide the program described above via a network, such as the Internet or e-mail.

Figure 3:
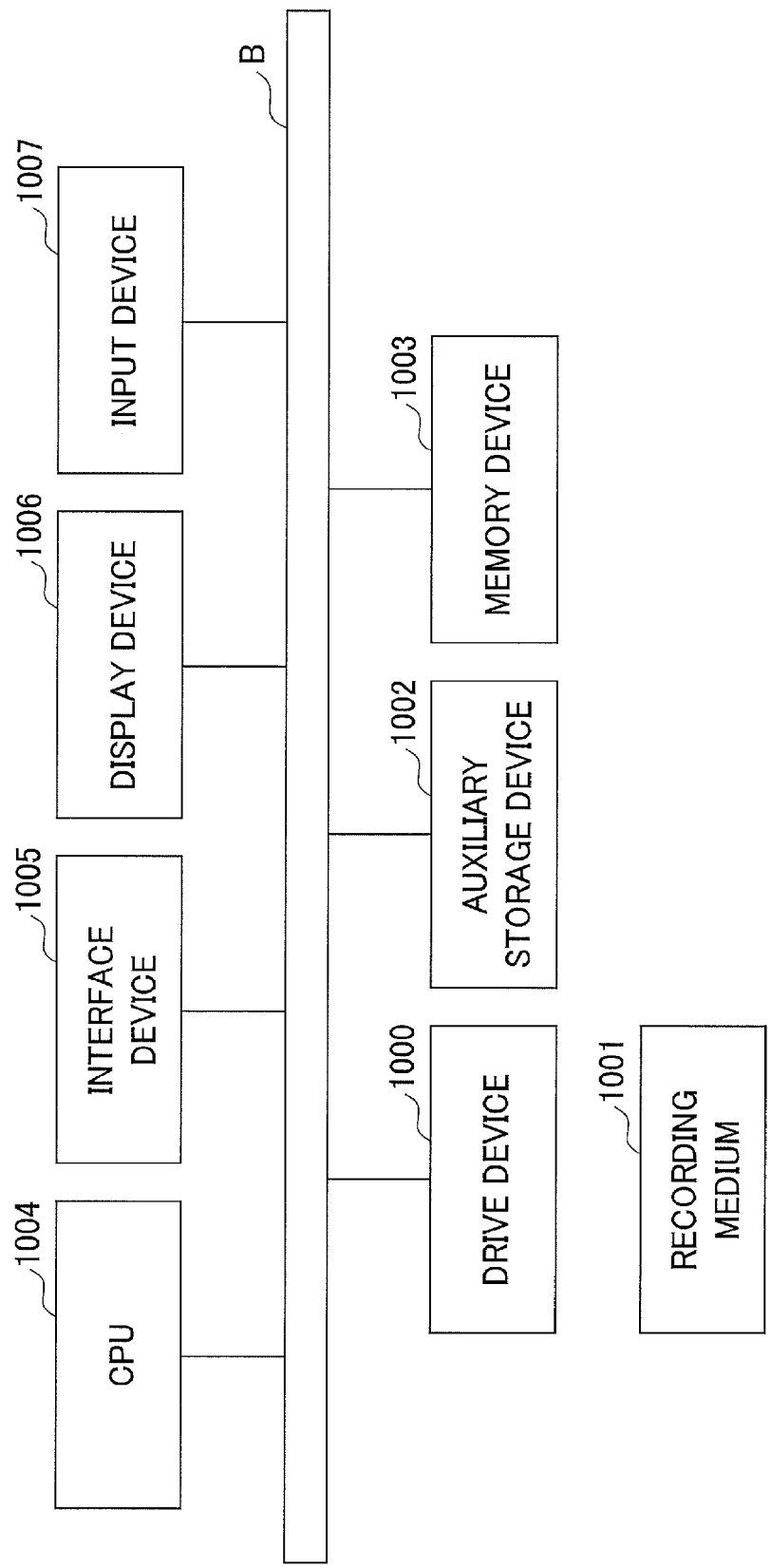
FIG. 3 is a hardware configuration diagram of an access device 100.

FIG. 3 is a diagram illustrating an example of a hardware configuration of the computer described above. The computer in FIG. 3 includes a drive device 1000, an auxiliary storage device 1002, a memory device 1003, a CPU 1004, an interface device 1005, a display device 1006, an input device 1007, and the like; and these devices are mutually connected via a bus B.

A program for implementing processing on the computer is provided with, for example, a recording medium 1001 such as a CD-ROM or memory card. When the recording medium 1001 on which the program is recorded is set in the drive device 1000, the program is installed in the auxiliary storage device 1002 from the recording medium 1001 via the drive device 1000. However, installation of the program does not need to be executed with the recording medium 1001, and may be downloaded from another computer via the network. The auxiliary storage device 1002 stores the installed program, and stores necessary files, data, and the like.

When a program start command is activated, the memory device 1003 reads the program to be loaded from the auxiliary storage device 1002. The CPU 1004 implements functions related to the access device 100 according to the program stored in the memory device 1003. The interface device 1005 is used as an interface for connecting to a network, and functions as an input unit and an output unit via the network. The display device 1006 displays a programmed GUI (Graphical User Interface) and the like. The input device 157 may be constituted with a keyboard and a mouse, buttons, a touch panel, or the like, and may be used for inputting various operating commands.

In the following, a configuration and operations of each unit of the access device 100 will be described in detail.
<Common Application Management Unit 130>

The common application management unit 130 includes an application management DB and an application cache (which may be referred to as an application table). FIG. 4 illustrates an example of information stored in the application management DB, and FIG. 5 illustrates an example of information stored in the application cache.

The application management DB manages various communication patterns of SaaS; in an example illustrated in FIG. 4, as columns of the application management DB, application name, FQDN, and destination IP address are included. FIG. 4 is merely an example, and the configuration of the application management DB is not limited to that illustrated in FIG. 4. For example, in addition to the application name, FQDN, and destination IP address in FIG. 4, destination port number may be included. Also, other parameters used to identify a SaaS application may be included.

The information illustrated in FIG. 4 shows that there are three types of communication patterns related to a SaaS whose application name is "Example"; the destination FQDN is Example.com or Example 365.com, or the destination IP address is B.B.B.B/B.

The application cache records IP addresses of destination servers of SaaS currently recognized by the access device 100. As illustrated in FIG. 5, as the columns of the application cache, for example, application name and destination IP address are included, but not limited as such. Also, FIG. 5(*a*) illustrates a case where the destination IP address of an application named "Example" is recognized as B.B.B.B. FIG. 5(*b*) illustrates, for example, a case where the destination IP address of the application named "Example" is recognized as B.B.B.B, and then, as the destination IP address of "Example", A.A.A.A is detected.
<DNS Control Unit 120>

As illustrated in FIG. 2, the DNS control unit 120 includes a DNS dispatch unit 121 and a DNS dispatch policy management unit 122.

The DNS dispatch unit 121 dispatches DNS queries (also referred to DNS query packets), according to DNS dispatch policies managed by the DNS dispatch policy management unit 122. In other words, the DNS dispatch unit 121 determines the destination of a DNS query according to the DNS dispatch policies, and transmits the DNS query to the destination.

The DNS dispatch policy management unit 122 includes a DNS dispatch policy management DB illustrated in FIG. 6. The DNS dispatch policy management DB is a database that stores information defining an operation to be executed for each DNS query. In an example illustrated in FIG. 6, an operation is defined for a DNS query including an FQDN of Example.com or Example 365.com that forwards the query to the external DNS server 310 having an IP address of Y.Y.Y.Y, and an operation is defined for any other query treated as the default operation that forwards the query to the internal DNS server 210.
<SD-WAN Routing Unit 140>

As illustrated in FIG. 2, the SD-WAN routing unit 140 includes an application detection unit 141, a routing control unit 142, and a routing policy management unit 143.

The application detection unit 141 examines a data flow (more specifically, packets constituting the data flow) routed by the SD-WAN routing unit 140, to detect an application as the destination or transmission source of the data flow. The routing control unit 142 executes packet routing according to routing policies managed by the routing policy management unit 143.

The routing policy management unit 143 includes an IP routing policy management DB and an application routing policy management DB. FIG. 7(*a*) illustrates an example of information stored in the IP routing policy management DB, and FIG. 7(b) illustrates an example of information stored in the application routing policy management DB.

The IP routing policy management DB corresponds to a routing table of a typical router, and stores destination IP addresses and next hops as illustrated in FIG. 7(a).

The application routing policy management DB is a database that stores information defining a routing control method with respect to a target application. FIG. 7(b) illustrates, as an example, information defining a routing operation that forwards a SaaS flow of a target application "Example" to a next hop defined locally (internet connection IF (J.J.J.J.)).

FIG. 7(a) illustrates that the IP routing policy management DB has columns of destination IP address and next hop, and FIG. 7(b) illustrates that the application routing policy management DB has columns of target application and next hop; note that these are merely examples. Each of the IP routing policy management DB and the application routing policy management DB may include columns of source IP address, port number, and the like.

In the following, as the basic operations of the access device 100, operations for setting/updating the databases (referred to as management flow control), and operations executed when the user terminal 10 executes communication (referred to as data flow control) will be described.

<Management Flow Control>

Figure 8:
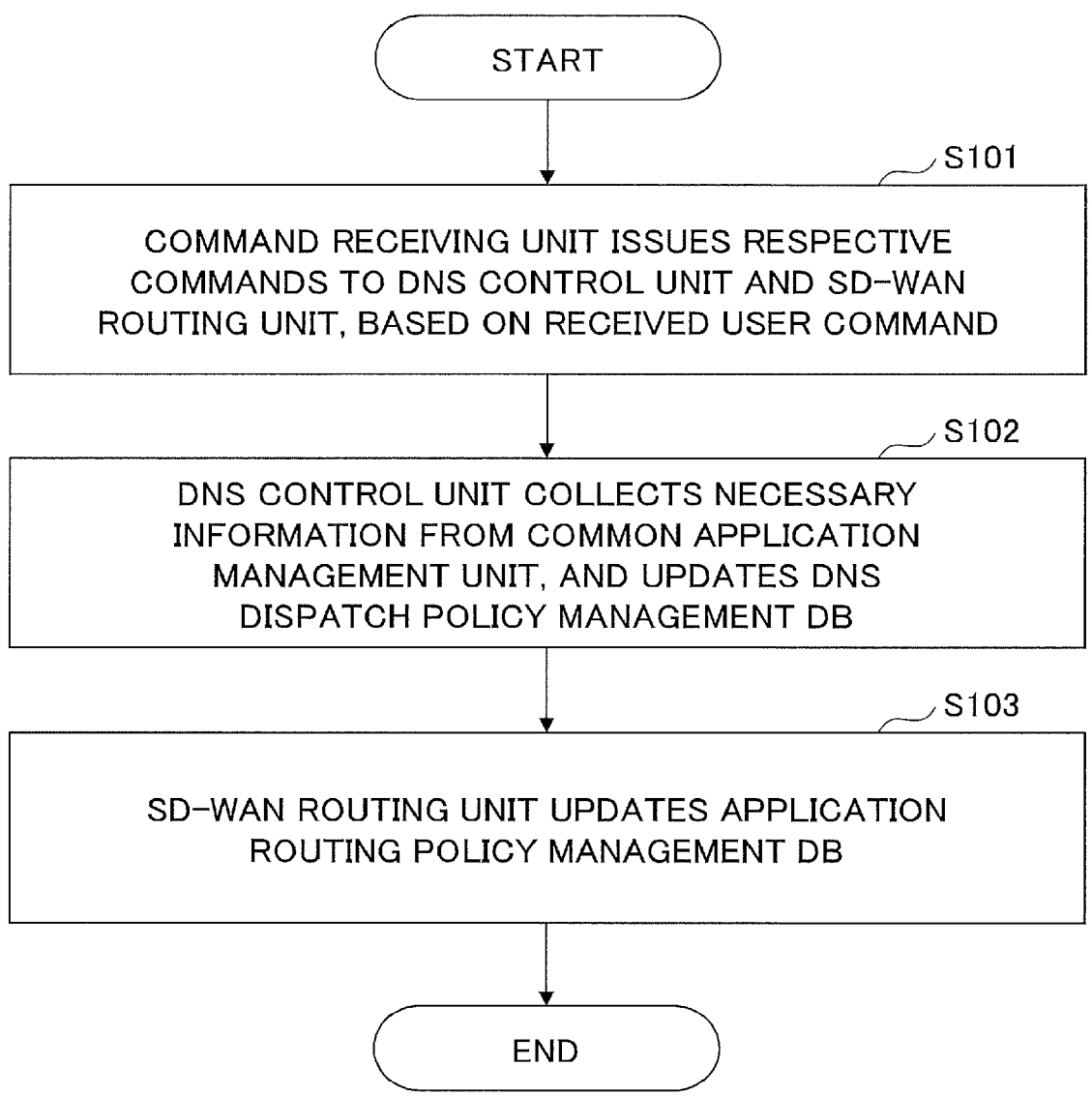
FIG. 8 is a flow chart of management flow control in the first embodiment.

The operations of the access device 100 executed for management flow control will be described along with steps in a flow chart illustrated in FIG. 8.

S101) Designation of Target

The command receiving unit 110 receives designation of a target SaaS to which Local Breakout is applied from the user, and based on the received contents, issues a command to the DNS control unit 120 and a command to the SD-WAN routing unit 140.

S102) Update of DNS Dispatch Policy Management DB

The DNS control unit 120 collects necessary information for executing Local Breakout with respect to the target SaaS from the common application management unit 130, and updates the DNS dispatch policy management DB (e.g., FIG. 6).

The necessary information for executing Local Breakout with respect to a target SaaS is, for example, one or more FQDNs (a list of FQDNs) corresponding to the target SaaS. The DNS control unit 120 associates an FQDN in the obtained FQDN list with an assumed operation, and stores the associated data in the DNS dispatch policy management DB.

In the present embodiment, as the next hop upon executing Local Breakout, the IP address of the external DNS server 310 (Y.Y.Y.Y) that has been set in advance is assumed. For a query on FQDN other than that, the IP address of the internal DNS server 210 (X.X.X.X.X) is assumed.

For example, the first record in FIG. 6 records information corresponding to an operation of forwarding a DNS query to an IP address (Y.Y.Y.Y) in the case where the FQDN of a target SaaS in the DNS query is Example.com.

S103) Update of Application Routing Policy Management DB

The SD-WAN routing unit 140 updates the application routing policy management DB (e.g., FIG. 7(b)). Specifically, as illustrated in FIG. 7(b), information associating a target SaaS with a next hop address defined in advance is recorded.

Example 1 of Data Flow Control

Figure 9:
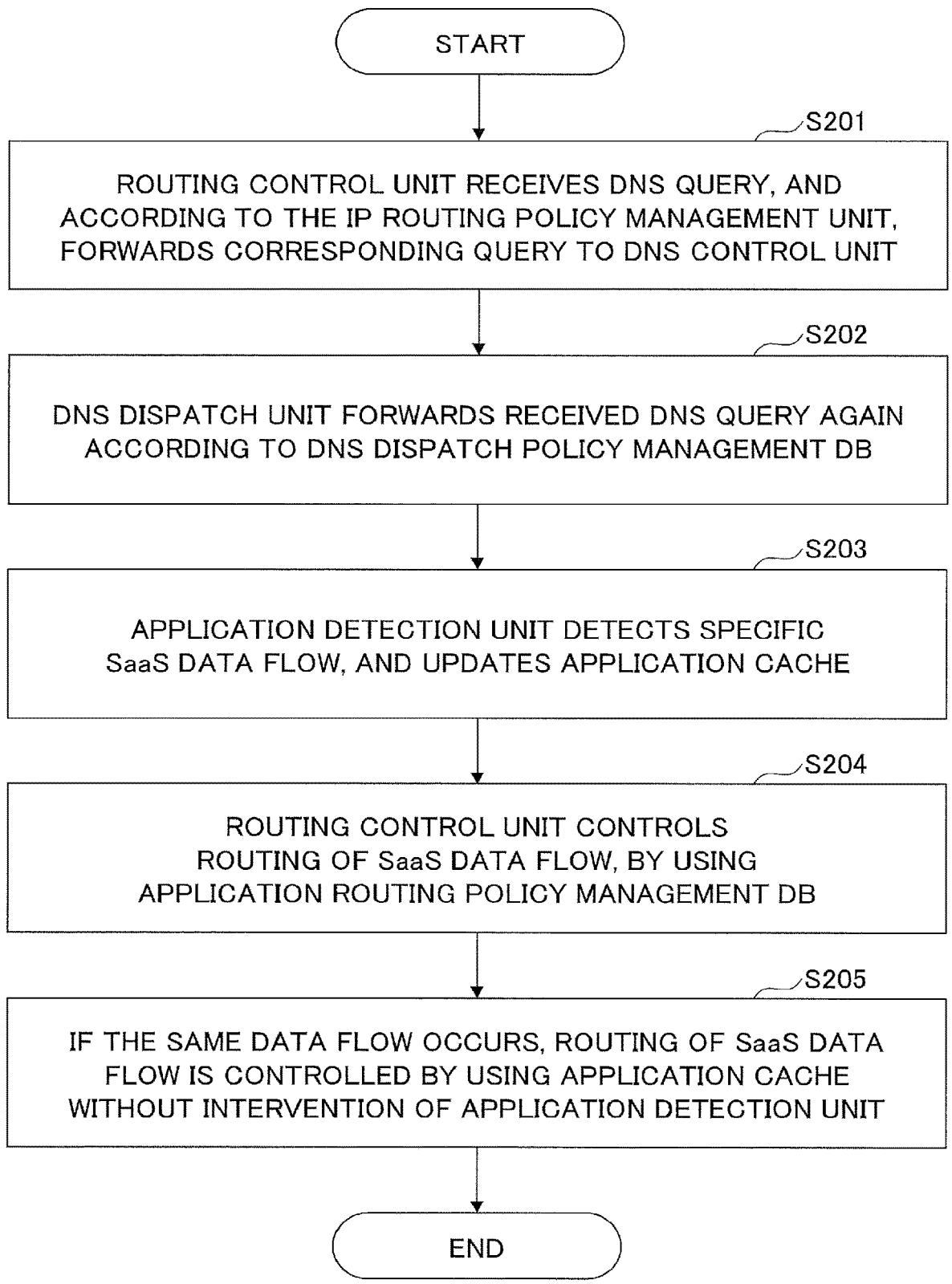
FIG. 9 is a flow chart of data flow control in the first embodiment.

Next, operations of the access device 100 in Example 1 of data flow control will be described along with steps in a flow chart in FIG. 9. In Example 1, in the data flow control, on the user terminal 10, the address of a DNS server is set to the DNS control unit 120 (Z.Z.Z.Z) of the access device 100.

S201) Reception/Forwarding of DNS Query

The routing control unit 142 receives a DNS query transmitted from the user terminal 10, and forwards the query to the DNS control unit 120 in substantially the same way as a typical router, according to the IP routing policy management DB (e.g., FIG. 7(a)). The DNS dispatch unit 121 of the DNS control unit 120 receives the DNS query.

S202) Re-Forwarding of DNS Query

The DNS dispatch unit 121 in the DNS control unit 120 re-forwards the received DNS query according to the DNS dispatch policy management DB (e.g., FIG. 6).

For example, in the case where the FQDN included in the DNS query is Example.com as the target SaaS, the DNS dispatch unit 121 forwards the DNS query to the external DNS server 310 (Y.Y.Y.Y) according to the DNS dispatch policy management DB (FIG. 6); and forwards the other DNS queries to the internal DNS server 210 according to the default operation. Note that also in Example 1 of data flow control, by providing a query destination change unit 123 to be described later, the destination of the DNS query may be changed to the IP address of the forwarding destination.

Thereafter, the user terminal 10 receives the IP address transmitted from the DNS server, and starts data communication directed to the IP address as the destination.

S203) Detection of Data Flow

After the DNS query has been processed, once data communication by the user terminal 10 is started, the data flow with respect to the target SaaS is received by the LAN-IF 170, and transmitted to the SD-WAN routing unit 140.

The application detection unit 141 of the SD-WAN routing unit 140 detects a specific data flow with respect to a SaaS, and updates the application cache (e.g., FIG. 5) by using the destination IP address of the flow. As the method of detecting a SaaS data flow by the application detection unit 141, for example, there is an extraction method from the header of HTTP/HTTPs, though not limited as such.

S204) Routing Control

The routing control unit 142 controls routing of the SaaS data flow, by using the application routing policy management DB (e.g., FIG. 7(b)) and the application cache (e.g., FIG. 5). For example, in the case where the target SaaS is Example.com, A.A.A.A is recorded on the application cache as the destination address for Example.com, and then, in response to receiving a packet whose destination is A.A.A.A, the routing control unit 142 refers to the application cache, and thereby, recognizes that the target SaaS is Example, and with reference to the application routing policy management DB, forwards the packet to the internet connection IF 160 (J.J.J.J).

S205) Routing Control

Thereafter, in the case where the same data flow occurs, without intervention of the application detection unit 141, by using the application cache, routing control can be executed.

Example 2 of Data Flow Control

Next, as Example 2 of data flow control, for a case in which the address of the DNS server on the user terminal 10 is set to the internal DNS server 210 (X.X.X.X), different points from Example 1 of data flow control will be described.

Figure 10:
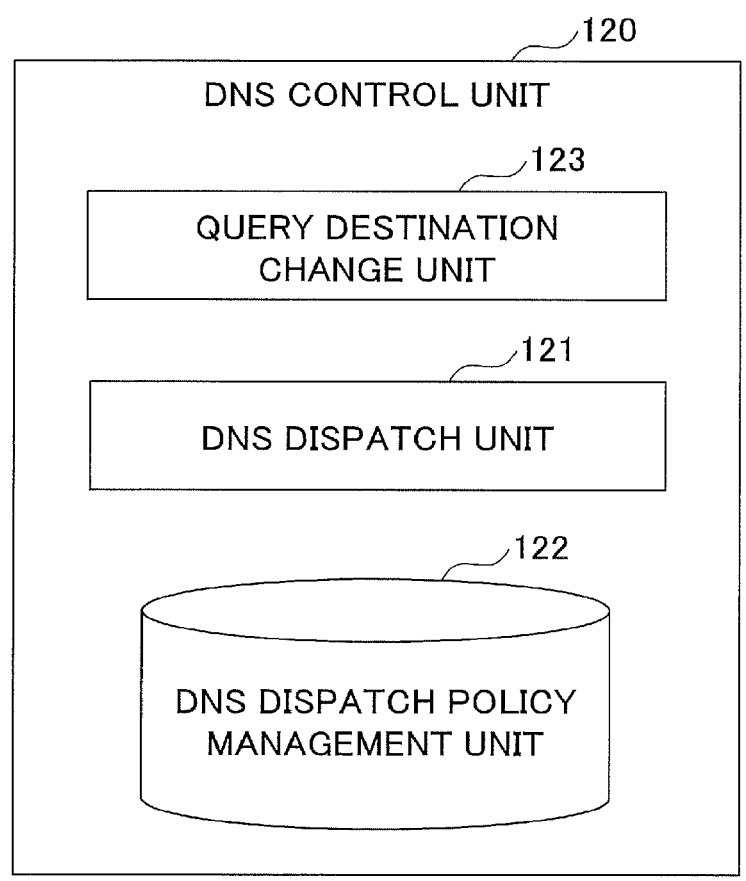
FIG. 10 is a configuration diagram of a DNS control unit in the case of rewriting the destination of a DNS query.

In Example 2 of data flow control, as illustrated in FIG. 10, the DNS control unit 120 includes a query destination change unit 123, in addition to the DNS dispatch unit 121 and the DNS dispatch policy management unit 122.

Also, as illustrated in FIG. 11, a routing policy for a DNS query is newly added to the application routing policy management DB. This routing policy is a policy to identify traffic of a DNS query with a port number (e.g. 53), and sets the next hop to the DNS control unit 120 (Z.Z.Z.Z).

Figure 12:
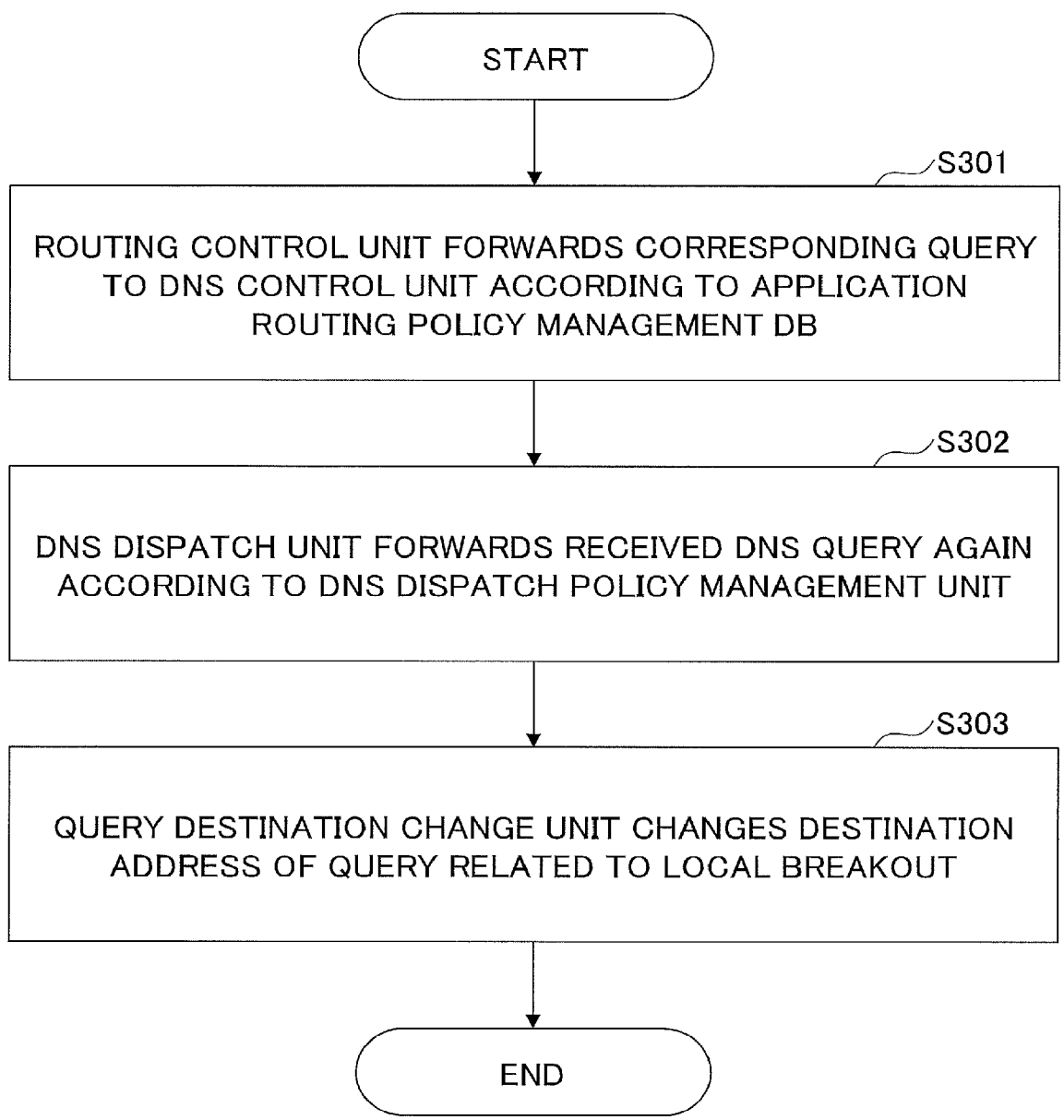
FIG. 12 is a flow chart of data flow control in the case of rewriting the destination of a DNS query.

Control of the data flow in this case will be described along with steps in a flow chart in FIG. 12.

S301) Reception/Forwarding of DNS Query

In response to receiving a DNS query, the routing control unit 142 forwards the DNS query to the DNS control unit 120 (Z.Z.Z.Z) according to the DNS policy in the application routing policy management DB (FIG. 11).

S302) Re-Forwarding of DNS Query

The DNS dispatch unit 121 in the DNS control unit 120 re-forwards the received DNS query according to the DNS dispatch policy management unit 122. Queries other than those directed to the target SaaS are re-forwarded to the internal DNS server 210 (X.X.X.X) according to the default operation.

S303) Change of Destination Address

On the other hand, the DNS query of the target SaaS is re-forwarded after the destination is changed by the query destination change unit 123. The destination address of the DNS query after the change is set in advance; for example, the IP address (Y.Y.Y.Y) of the external DNS server 310 is set as the destination after the change. The subsequent processing is substantially the same as in Example 1 of data flow control.

<Update of Application Cache Using Result of DNS Query>

In the example described above, by analyzing packets by the application detection unit 141, a SaaS application corresponding to the data flow associated with the packets is identified, to update the application cache (e.g., FIG. 5). Instead of (or in addition to) this method, the application cache may be updated by using a result of a DNS query.

By providing a function of updating the application cache from time to time using a result of a DNS query, a SaaS application can be identified with a first packet.

Figure 13:
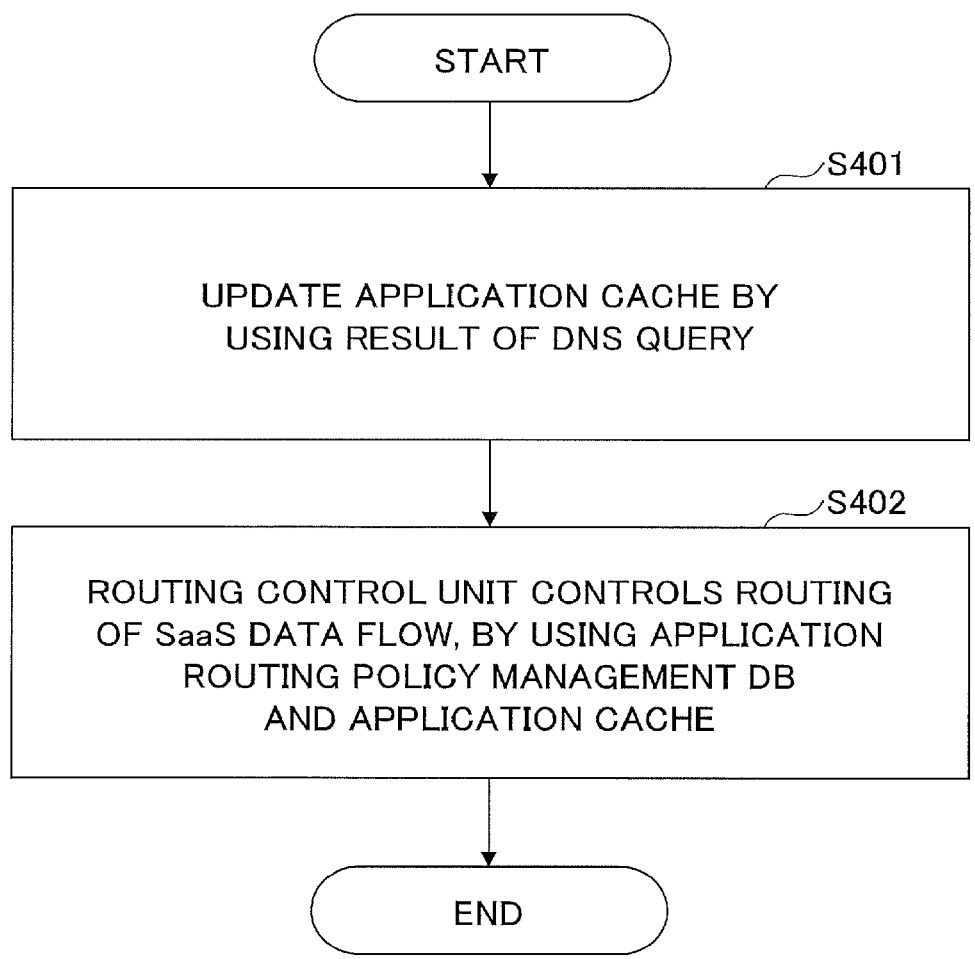
FIG. 13 is a flow chart in the case of updating an application cache from time to time by using a result of a DNS query.

Operations of the access device 100 in this case will be described along with steps in a flow chart in FIG. 13.

S401) Update of Application Cache

For example, a DNS query is forwarded to the external DNS server 310, and a query result (IP address corresponding to FQDN) transmitted from the external DNS server 310 is received by the routing control unit 142. The routing control unit 142 updates the application cache by using the query result.

For example, suppose the query result of Example.com is A.A.A.A, and the query result of Example 365.com is C.C.C.C; in the case where the routing control unit 142 receives the respective query results, the application cache is updated as illustrated in FIG. 14. In other words, a record including A.A.A.A and a record including C.C.C.C are added. Note that for both Example.com and Example 365.com, the application name is identified as "Example" in the present embodiment.

S402) Routing Control

Thereafter, in the case of receiving a data flow of the SaaS, the routing control unit 1 uses the application routing policy management DB (e.g., FIG. 7(b)) and the application cache (e.g., FIG. 14), to control the routing of the corresponding flow.

Specifically, the routing control unit 142 searches for the destination IP address of the data flow in the application cache, and if hitting a record, uses the application name of the record (target SaaS name) to search for the next hop of the target SaaS in the application routing policy management DB. As a result, the routing control unit 142 forwards the flow to the IP address described in the next hop.

Second Embodiment

Next, a second embodiment will be described. Here, different points from the first embodiment will be mainly described.

<Device Configuration>

Figure 15:
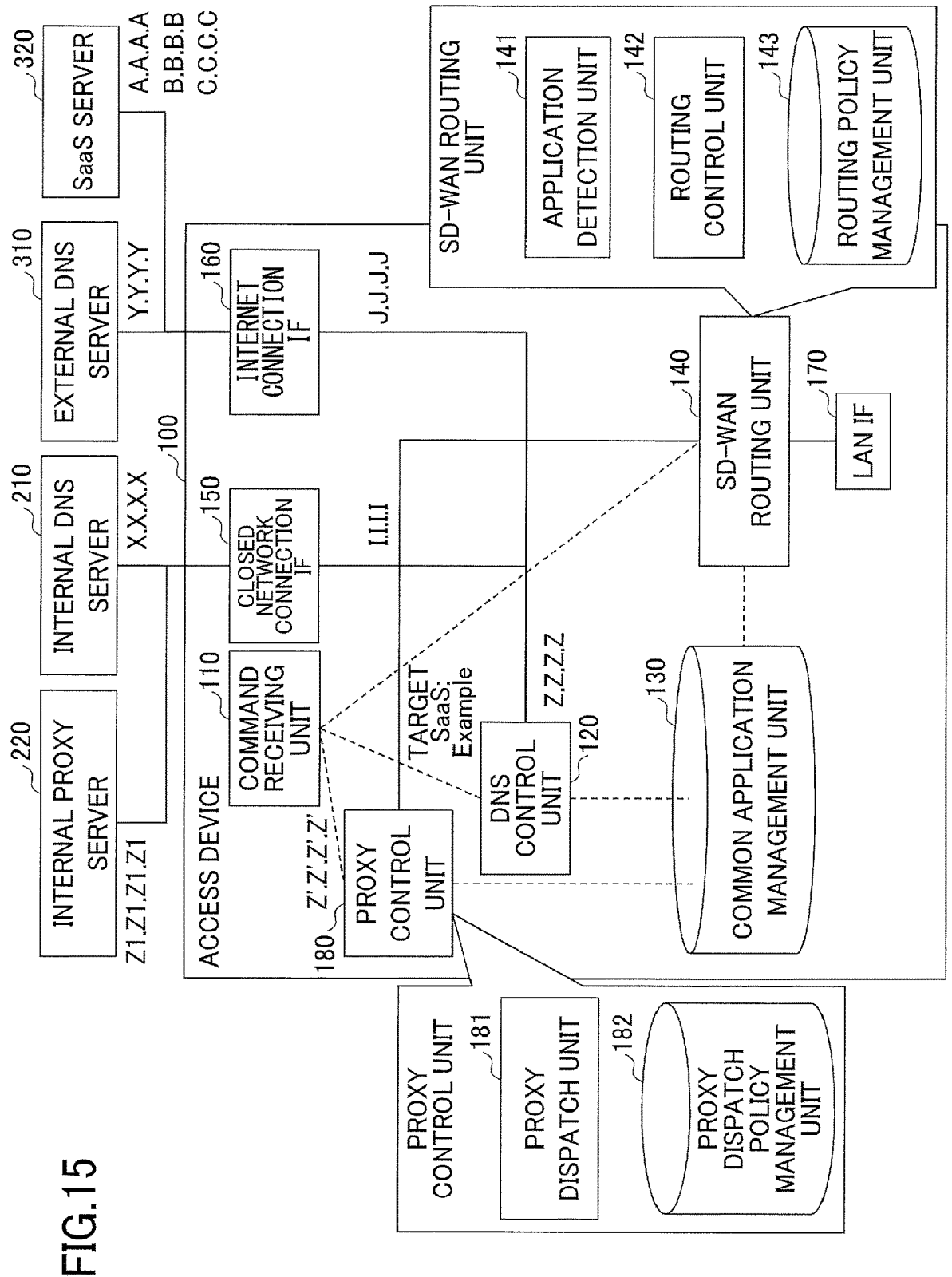
FIG. 15 is a functional configuration diagram of an access device 100 in a second embodiment.

FIG. 15 illustrates a functional configuration diagram of the access device 100 in the second embodiment. As illustrated in FIG. 15, an access device 100 in the second embodiment has a configuration in which a proxy control unit 180 is added to the access device 100 in the first embodiment. Also, FIG. 15 illustrates an internal proxy server 220. As illustrated, here, the IP address of the proxy control unit 180 is Z'.Z'.Z'.Z', and the IP address of the internal proxy server 220 is Z1.Z1.Z1.Z1.

As illustrated in FIG. 15, the proxy control unit 180 includes a proxy dispatch unit 181 and a proxy dispatch policy management unit 182.

In the second embodiment, in order to route traffic to the proxy control unit 180, as illustrated in FIG. 16(a), a policy related to Z'.Z'.Z'.Z' is newly added to the IP routing policy management DB in the routing policy management unit 143.

Also, the proxy dispatch policy management unit 182 has a proxy dispatch policy management DB. FIG. 17 illustrates an example of information stored in the proxy dispatch policy management DB. As illustrated in FIG. 17, the proxy dispatch policy management DB is a database that stores FQDN and information defining a control operation of a proxy with respect to an IP address.

The proxy dispatch unit 181 executes dispatch control of traffic according to the information in the proxy dispatch policy management DB. For example, in the case of receiving a packet whose destination FQDN is Example.com, the proxy dispatch unit 181 causes the packet to pass through a proxy. In the case of the default, the proxy dispatch unit 181 executes proxy chaining with the internal proxy (Z1.Z1.Z1.Z1).

<Management Flow Control>

Figure 18:
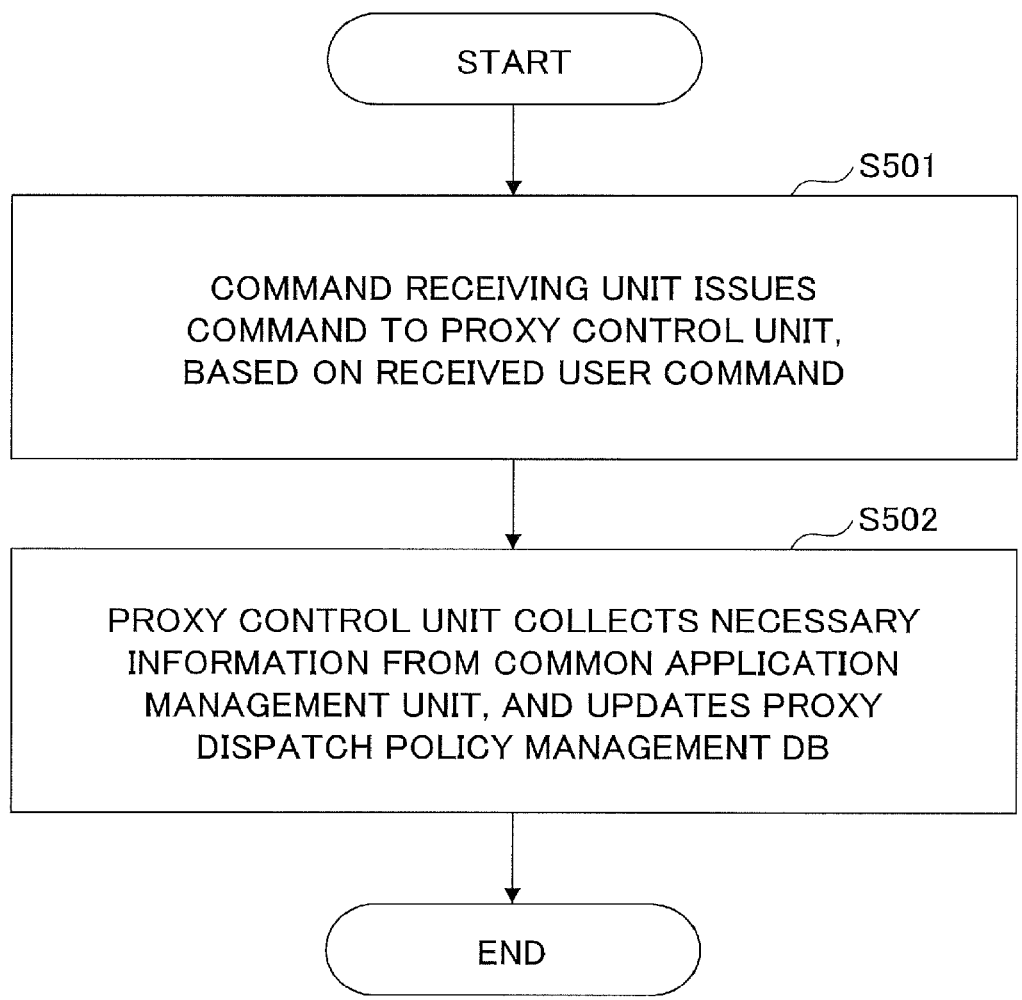
FIG. 18 is a flow chart of management flow control in the second embodiment.

A control flow added with the addition of the proxy control unit 180 will be described along with steps in a flow chart illustrated in FIG. 18.

S501) Designation of Target

First, the command receiving unit 110 receives designation of a target SaaS to which Local Breakout is applied from the user, and issues a command to the proxy control unit 180, based on received contents.

S502) Update of Proxy Dispatch Policy Management DB

The proxy control unit 180 collects necessary information for Local Breakout with respect to the target SaaS from the application management DB of the common application management unit 130, and updates the proxy dispatch policy management DB.

The necessary information for executing Local Breakout with respect to the target SaaS includes, for example, one or more FQDNs (list of FQDNs) corresponding to the target SaaS, and one or more IP addresses (list of IP addresses)

The proxy control unit 180 associates the obtained list of FQDNs and list of IP addresses with assumed operations, and stores the associated data in the proxy dispatch policy management DB.

As illustrated in FIG. 17, the next hop in the case of a non-pass through (case of default) is set to the IP address of the internal DNS server 220 (Z1.Z1.Z1.Z1) as the destination of proxy chaining.

<Data Flow Control>

Figure 19:
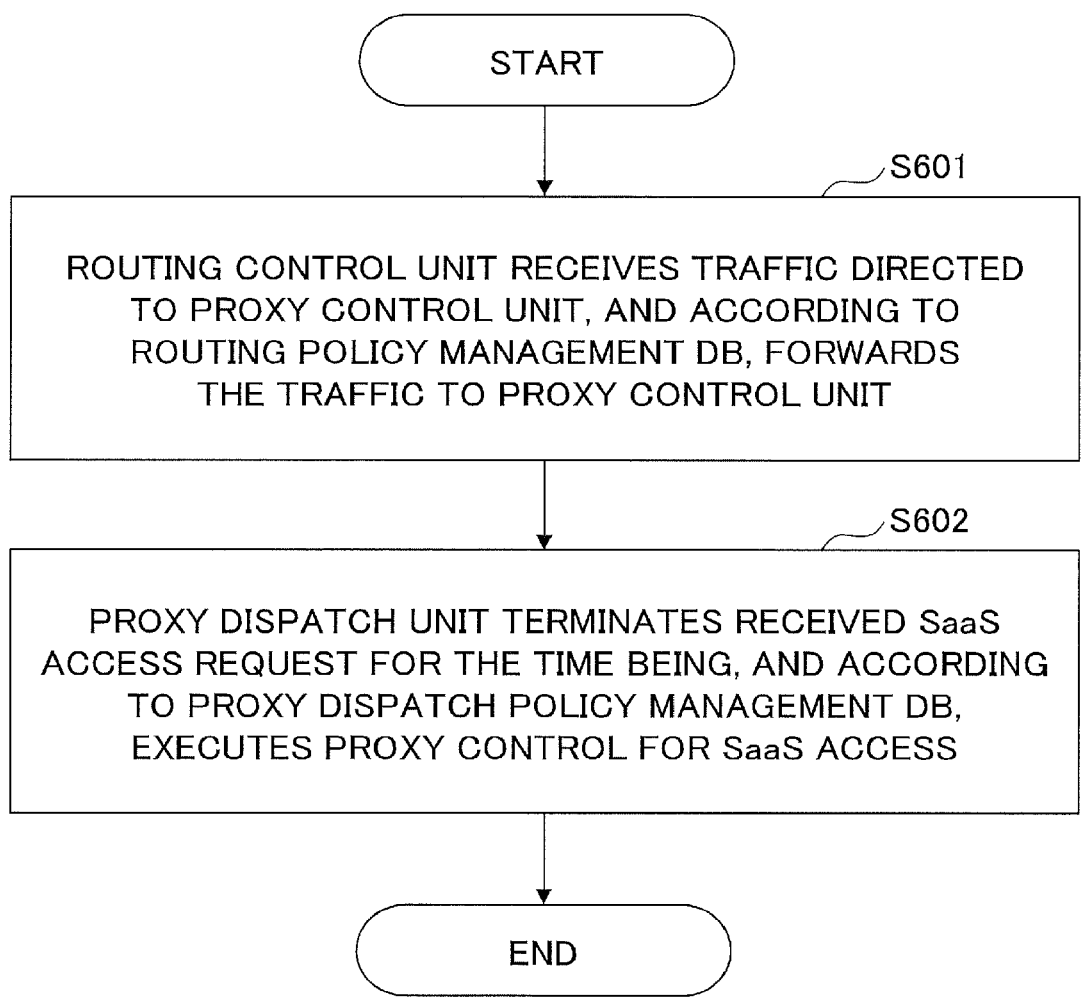
FIG. 19 is a flow chart of data flow control in the second embodiment.

Next, operations of the access device 100 in data flow control will be described along with steps in a flow chart in FIG. 19.

S601) Reception/Forwarding of Traffic

The routing control unit 142 receives traffic directed to the proxy control unit 180 (a SaaS access request is assumed here), and according to the IP routing policy management DB of the routing policy management unit 143 (e.g., FIG. 16(a)), forwards the traffic to the proxy control unit 180 (Z'.Z'.Z'.Z'). The proxy dispatch unit 181 in the proxy control unit 180 receives the traffic (SaaS access request).

S602) Reception/Forwarding of Traffic

The proxy dispatch unit 181 terminates the received SaaS access request for the time being, and according to the proxy dispatch policy management DB (FIG. 17), executes proxy control for accessing the SaaS.

As an example, a request for accessing Example.com is treated as pass through according to a defined operation in FIG. 17. In the case of pass through, the proxy control unit 180 initiates a DNS query. Operations of the DNS query and a sequence of subsequent operations are substantially the same as described above. Note that the DNS query in this case is transmitted from the proxy control unit 180 to the routing control unit 142, and then, transmitted from the routing control unit 140 to the DNS control unit 120.

On the other hand, a data flow other than that of accessing the target SaaS corresponds to the default operation, and in order to execute chaining with the internal proxy server 220, the proxy control unit 180 makes a request for accessing the data flow to the internal proxy server 220. An example of the contents of the request, the following format may be considered.

[IP header (excerpt)]
Src IP:Z'.Z'.Z'.Z'
Dst IP:Z1.Z1.Z1.Z1
[TCP header (excerpt)]
Src port:26001
Dst port:443
[Http request (excerpt)]
GET https://www.example.com By the request described above, for the corresponding data flow, the internal proxy server 220 operates as a proxy for the user terminal 10.

<Other Example of Information Collection Method>

In the example of management flow described above, although the proxy control unit 180 collects necessary information from the application management DB of the common application management unit 130, in addition (or instead), the proxy control unit 180 may collect information from the application cache. FIG. 20 illustrates an example of the updated proxy dispatch policy management DB 182 using information collected from the application cache.

In this case, in addition to the lists of FQDNs and IP addresses corresponding to the target SaaS from the application management DB, the proxy control unit 180 also collects IP addresses that have already been cached from the application cache, and associates these IP addresses with assumed operations in the proxy dispatch policy management DB. Also, the proxy dispatch policy management unit 182 periodically synchronizes with the common application management unit 130, to hold the latest information on the application management DB and the application cache all the time.

The IP address of a SaaS server is changed from time to time; therefore, by holding the latest information on the application cache as described above, an operation based on a correct IP address can be executed.

<Regular Update of Application Management DB and Application Cache>

Figure 21:
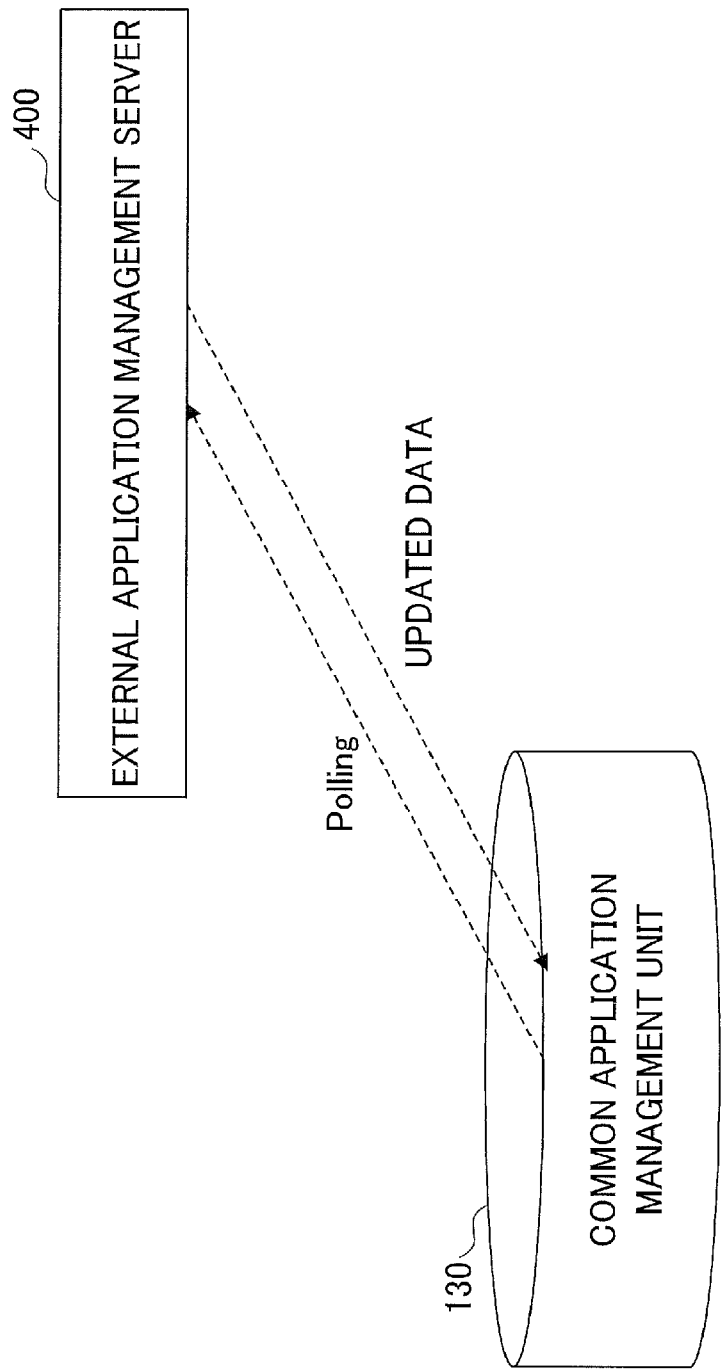
FIG. 21 is a diagram for describing periodic updates of an application management DB.
Figure 22:
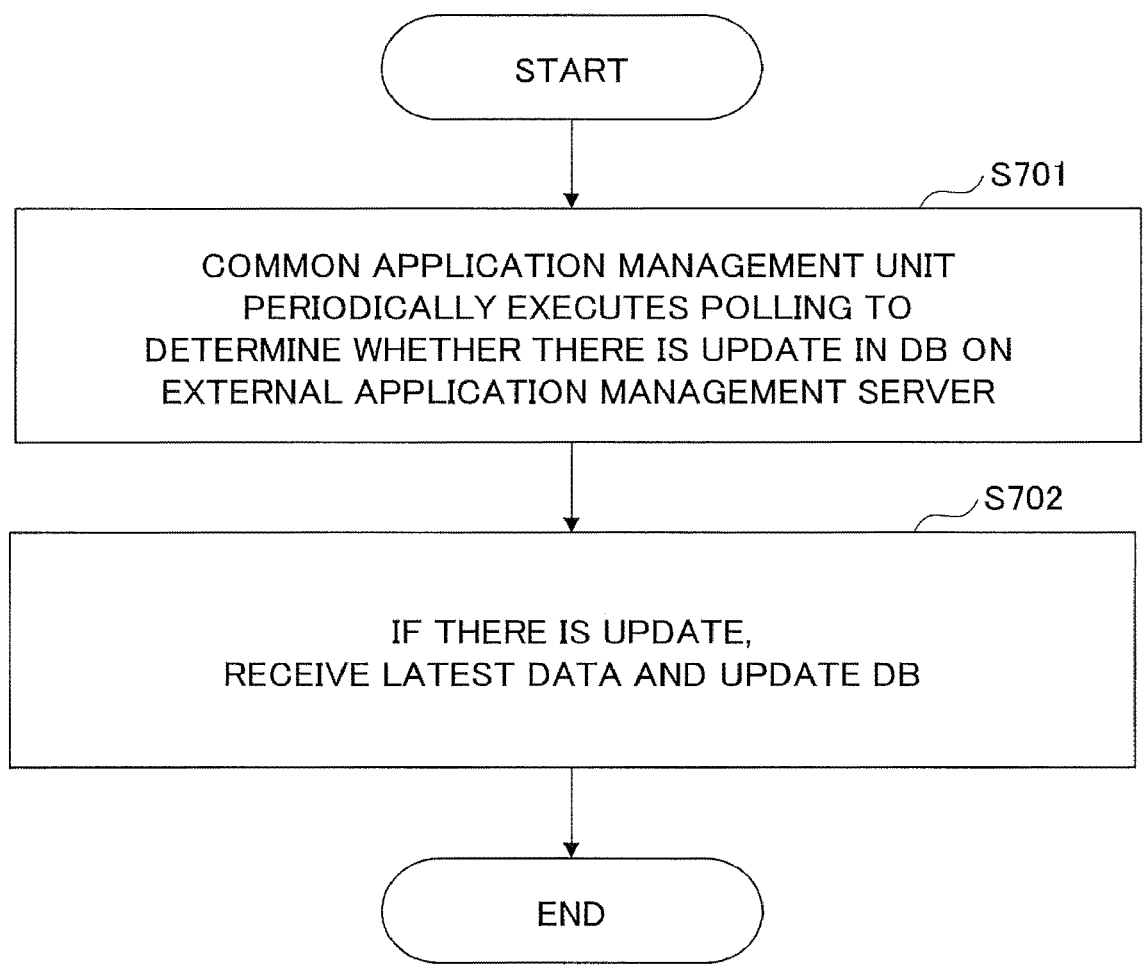
FIG. 22 is a flow chart of periodic updates of the application management DB.

As operations common to the first embodiment and the second embodiment, as illustrated in FIG. 21, by obtaining information from an external application management server 400, the common application management unit 130 may periodically update the application management DB. Operations in this case will be described with reference to a flow chart in FIG. 22. Here, assume that the external application management server 400 stores the latest information.

S701) Polling

The common application management unit 130 periodically makes queries (polling) whether there is an update in a database on the external application management server 400.

S702) Update

If detecting an update, the common application management unit 130 receives the latest data, and updates the application management DB.

Also, the common application management unit 130 may periodically update the application cache. In this case, as illustrated in FIG. 23, the application cache holds a timer value for each record. The common application management unit 130 monitors the application cache, and automatically deletes a record if there has been no update until a point in time when a period corresponding to the timer value has elapsed after the data of the record was set.

The IP address of a SaaS server is not fixed and is changed from time to time; therefore, by providing an update mechanism as described above, an operation based on the correct IP address can be executed.

Effects and the Like of Embodiment

As described above, in the access device 100 according to the embodiment of the present invention, in addition to the SD-WAN routing unit 140, the common application management unit 130, the DNS control unit 120, and the proxy control unit 180 are provided.

The DNS control unit 120 follows control of a data flow of a specific SaaS with reference to the common application management unit 130, determines an optimum exit of the DNS traffic related to the data flow, and controls the data flow. Similarly, with reference to the common application management unit 130, the proxy control unit 180 executes routing control for a data flow of a specific SaaS, so as to bypass an existing proxy. Further, the IP address of a SaaS server obtained as the result of a DNS query executed via the DNS control unit 120, can be reflected in the application cache from time to time, and by using the IP of the SaaS server as the access destination, the specific SaaS can be identified.

By the access device 100 having the configuration described above, when executing breakout directly from a branch site for a data flow of a specific SaaS, the DNS traffic and/or routing to the proxy related to access to the SaaS can be controlled to be adaptively linked with the breakout, and thereby, an optimal access to the SaaS can be implemented.

In other words, by causing a DNS flow and a corresponding data flow to have the same exit, a SaaS server nearest to a branch site can be accessed. Also, by bypassing an existing proxy, reduction in the proxy processing load caused by the SaaS access can be expected. Further, by using the latest results of DNS queries, a specific SaaS can be identified with a first packet.

Summary of Embodiment

As described above, according to the present embodiment, at least a control device, a control method, and a program are provided as described below.
(Matter 1)
A control device that is connected to a plurality of networks, and dispatches a packet received from a user terminal to a network among the plurality of networks, the control device comprising:
a DNS control unit configured to receive a DNS query packet transmitted from the user terminal, and based on a query target of the DNS query packet, dispatch the DNS query packet to a network among the plurality of networks; and
a routing unit configured to receive a packet, determine a destination of the packet based on a destination address of the packet, and transmit the packet to the determined destination.
(Matter 2)
The control device as described in Matter 1, further comprising:
an application table configured to store information for associating a destination address of a packet with an application of the destination of the packet,
wherein the routing unit refers to the application table to recognize an application corresponding to a destination address of a received packet, and dispatches the received packet to a network among the plurality of networks according to a policy specified in advance with respect to the application.
(Matter 3)
The control device as described in Matter 2, wherein the routing unit updates the application table by using the query target of the DNS query packet and an address received as a response to a query.
(Matter 4)
The control device as described in Matter 2 or 3, wherein the application table has a timer value for each record, and a record for which a period corresponding to the timer value has elapsed is deleted.
(Matter 5)
The control device as described in any one of Matters 1 to 4, wherein the DNS control unit rewrites the destination address of the DNS query packet in accordance with a dispatch destination of the DNS query packet.
(Matter 6)
The control device as described in any one of Matters 1 to 5, wherein the control device is connected to a predetermined proxy device, and the control device further includes a proxy control unit configured to determine whether to transmit a received packet to the proxy device, based on an application as an access destination of the received packet.
(Matter 7)
The control device as described in Matter 6 and dependent on any one of Matters 2 to 4, wherein the proxy control unit includes a proxy dispatch table configured to record a destination address and an operation for each application, by referring to the proxy dispatch table, determines whether to transmit a packet to the proxy device, and updates the proxy dispatch table by using the application table.
(Matter 8)
The control device as described in any one of Matters 1 to 7, further comprising:
an application management database configured to manage information on an application; and
a management unit configured to update the application management database, by periodically accessing an external application management server.
(Matter 9)
A control method executed by a control device that is connected to a plurality of networks, and dispatches a packet received from a user terminal to a network among the plurality of networks, the control method comprising:
a step of receiving a DNS query packet transmitted from the user terminal, and based on a query target of the DNS query packet, dispatching the DNS query packet to a network among the plurality of networks; and a step of receiving a packet, determining a destination of the packet based on a destination address of the packet, and transmitting the packet to the determined destination.
(Matter 10)
A program for causing a computer to function as respective units in the control device as described in any one of Matters 1 to 8.

As above, the present embodiment has been described; note that the present invention is not limited to such a specific embodiment, and various modifications and alterations can be made within the scope of the subject matters of the present invention described in the claims.

The present patent application claims priority based on Japanese Patent Application No. 2018-176630 filed on Sep. 20, 2018, and the entire contents of Japanese Patent Application No. 2018-176630 are incorporated herein by reference.

DESCRIPTION OF SYMBOLS 10 user terminal
20 closed network
30 Internet
100 access device
110 command receiving unit
120 DNS control unit
121 DNS dispatch unit
122 DNS dispatch policy management unit
123 query destination change unit
130 common application management unit
140 SD-WAN routing unit
141 application detection unit
142 routing control unit
143 routing policy management unit
150 closed network connection IF
160 internet connection IF
170 LAN-IF
180 proxy control unit
181 proxy dispatch unit
182 proxy dispatch policy management unit
210 internal DNS server
220 internal proxy server
310 external DNS server
320 SaaS server
400 external application management server
1000 drive device
1001 recording medium
1002 auxiliary storage device 1003 memory device
1004 CPU
1005 interface device
1006 display device
1007 input devices

The invention claimed is:

1. A control device that is connected to a plurality of networks, and dispatches a packet received from a user terminal to a network among the plurality of networks, the control device comprising:
   a memory; and
   a processor configured to execute
   receiving a DNS query packet transmitted from the user terminal, and based on a query target of the DNS query packet and a DNS dispatch policy management database, dispatching the DNS query packet to a DNS server connected to a network among the plurality of networks; and
   receiving a packet, determining a destination of the packet based on a destination address of the packet and an application routing policy management database, and transmitting the packet to the determined destination.

2. The control device as claimed in claim 1,
   wherein the memory further includes an application management database configured to manage information on an application; and
   wherein the processor is further configured to execute updating the application management database, by periodically accessing an external application management server.

3. A control device that is connected to a plurality of networks, and dispatches a packet received from a user terminal to a network among the plurality of networks, the control device comprising:
   a memory; and
   a processor configured to execute
   receiving a DNS query packet transmitted from the user terminal, and based on a query target of the DNS query packet, dispatching the DNS query packet to a network among the plurality of networks; and
   receiving a packet, determining a destination of the packet based on a destination address of the packet, and transmitting the packet to the determined destination,
   wherein the memory includes an application table configured to store information for associating a destination address of a packet with an application of the destination of the packet,
   wherein the receiving of the packet refers to the application table to recognize an application corresponding to a destination address of a received packet, and dispatches the received packet to a network among the plurality of networks according to a policy specified in advance with respect to the application.

4. The control device as claimed in claim 3, wherein the receiving of the packet updates the application table by using the query target of the DNS query packet and an address received as a response to a query.

5. The control device as claimed in claim 3, wherein the application table has a timer value for each record, and a record for which a period corresponding to the timer value has elapsed is deleted.

6. The control device as claimed in claim 3, wherein the receiving of the DNS query packet rewrites the destination address of the DNS query packet in accordance with a dispatch destination of the DNS query packet.

7. The control device as claimed in claim 3, wherein the control device is connected to a predetermined proxy device, and the processor is further configured to execute determining whether to transmit a received packet to the proxy device, based on an application as an access destination of the received packet.

8. The control device as claimed in claim 7, wherein the memory further includes a proxy dispatch table configured to record a destination address and an operation for each application, and by referring to the proxy dispatch table, the determining determines whether to transmit a packet to the proxy device, and updates the proxy dispatch table by using the application table.

9. A control method executed by a control device that is connected to a plurality of networks, dispatches a packet received from a user terminal to a network among the plurality of networks, and includes a memory and a processor, the control method comprising:
   receiving a DNS query packet transmitted from the user terminal, and based on a query target of the DNS query packet and a DNS dispatch policy management database, dispatching the DNS query packet to a DNS server connected to a network among the plurality of networks; and
   receiving a packet, determining a destination of the packet based on a destination address of the packet and an application routing policy management database, and transmitting the packet to the determined destination.

10. A non-transitory computer-readable recording medium having computer-readable instructions stored thereon, which when executed, causes a computer to execute a control method on the computer that is connected to a plurality of networks, and dispatches a packet received from a user terminal to a network among the plurality of networks, the control method comprising:
    receiving a DNS query packet transmitted from the user terminal, and based on a query target of the DNS query packet and a DNS dispatch policy management database, dispatching the DNS query packet to a DNS server connected to a network among the plurality of networks; and
    receiving a packet, determining a destination of the packet based on a destination address of the packet and an application routing policy management database, and transmitting the packet to the determined destination.

* * * * *